(12) United States Patent
Saito et al.

(10) Patent No.: US 6,273,209 B1
(45) Date of Patent: Aug. 14, 2001

(54) SEAL STRUCTURE OF TIE ROD MOUNTING PORTION IN CENTER TAKE-OFF TYPE POWER STEERING APPARATUS

(75) Inventors: Tatsuya Saito; Satoshi Hamano, both of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/670,256

(22) Filed: Sep. 26, 2000

(30) Foreign Application Priority Data

Nov. 25, 1999 (JP) ................................................. 11-333702

(51) Int. Cl.[7] ....................................................... B62D 5/22
(52) U.S. Cl. ............................................ 180/428; 180/435
(58) Field of Search .................................... 180/435, 428, 180/434, 439, 440, 417; 277/315, 636, 641, 634; 74/422, 388 PS

(56) References Cited

U.S. PATENT DOCUMENTS

| | | | |
|---|---|---|---|
| 4,373,599 | * | 2/1983 | Walter et al. . |
| 4,428,450 | * | 1/1984 | Stenstrom et al. . |
| 4,479,400 | * | 10/1984 | Rieger . |
| 4,653,602 | * | 3/1987 | Anders et al. . |
| 4,676,335 | * | 6/1987 | Adams . |
| 4,683,971 | * | 8/1987 | Wetsercamp et al. . |
| 4,709,591 | | 12/1987 | Emori et al. ............................ 74/422 |
| 4,811,813 | * | 3/1989 | Hovanchak . |
| 4,815,552 | * | 3/1989 | James . |
| 4,865,149 | * | 9/1989 | Rohrbach et al. . |

FOREIGN PATENT DOCUMENTS 1033815     12/1998     (JP) ................................. B62D/5/22

* cited by examiner

Primary Examiner—Anne Marie Boehler
(74) Attorney, Agent, or Firm—Orum & Roth

(57) ABSTRACT

A seal structure of a tie rod mounting portion in a center take-off type power steering apparatus structured such that respective inner ends of a pair of right and left tie rods are swingably connected to a leg portion of a T-shaped connection member. Both arm portions of the connection member are respectively connected to a rack shaft by a bolt passing through a guide shoe sliding within a notch groove formed along a lengthwise direction of a gear box housing, the respective inner ends of a pair of right and left tie rods laterally move in accordance with a lateral motion of the rack shaft while being guided by the guide shoe, a center portion of a dust boot is gripped between the guide shoe and both of the arm portions of the connection member by being passed through by the bolts. A collar is fitted between the guide shoe and the bolt and between the dust boot and the bolt so as to override between the rack shaft, the guide shoe and the dust boot, and one end portion of the collar protrudes from the dust boot so as to be brought into contact with the arm portion of the connection member, wherein a stepped recess portion to which both of the arm portions of the connection member are fitted, and an annular protruding wall which surrounds one end portion of the collar and is brought into contact with the arm portion of the connection member are respectively formed in the dust boot.

4 Claims, 7 Drawing Sheets

US 6,273,209 B1

SEAL STRUCTURE OF TIE ROD MOUNTING PORTION IN CENTER TAKE-OFF TYPE POWER STEERING APPARATUS

BACKGROUND OF THE INVENTION

1. Field of the Invention

The present invention relates to a seal structure of a tie rod mounting portion in a center take-off type power steering apparatus for a vehicle. More particularly to a seal structure of a tie rod mounting portion in a center take-off type power steering apparatus which improves a reliability for seal in a bolt passing portion of a dust boot passed through by a bolt in the tie rod mounting portion so as to be gripped.

2. Description of the Related Art

The conventional seal structure of the tie rod mounting portion in the center take-off type power steering apparatus is made as follows (refer to Japanese Patent Application No. 9-153292).

In FIG. 8, the structure is made such that respective inner ends of a pair of right and left tie rods 05 and 05 are respectively connected to a rack shaft 04 by a pair of right and left bolts 09 and 09 passing through a guide shoe 07 sliding within a notch groove 06 formed along a lengthwise direction of a gear box housing 03. It then moves laterally in correspondence to a lateral motion of the rack shaft 04 while being guided by the guide shoe 07.

A substantially center portion of a dust boot 011 is gripped between the guide shoe 07 and the respective inner ends of a pair of right and left tie rods 05 and 05 by being passed through by a pair of right and left bolts 09 and 09. Then, a metal fitting 013 is interposed between the dust boot 011 and the respective inner ends of a pair of right and left tie rods 05 and 05, and a collar 010 is fitted between the guide shoe 07 and the respective bolts 09 and between the dust boot 011 and the respective bolts 09 with overriding among the rack shaft 04, the guide shoe 07 and the guide boot 011.

One end portion (a lower end portion in FIG. 8) of the collar 010 protrudes from the dust boot 011 so as to be brought into contact with the metal fitting 013. Further, an annular protruding wall 025 is formed in the dust boot 011 so as to surround one end portion of the collar 010 and be brought into contact with the metal fitting 013.

Accordingly, as shown in FIG. 9, water going to enter from a direction of A is prevented by contact between the metal fitting 013 and the respective inner ends of a pair of right and left tie rods 05 and 05. The water going to enter from a direction of B is prevented by contact between the metal fitting 013 and one end portion of the collar 010 and contact between the metal fitting 013 and the annular protruding wall 025 of the dust boot 011. In the manner mentioned above, the water is prevented from entering into the dust boot 011 and further entering into the gear box 03.

However, since the conventional seal structure of the tie rod mounting portion in the center take-off type power steering apparatus is made as mentioned above, for example, there is generated a risk that a compressive reaction force F from the dust boot 011 acts on the seal structure as shown in FIG. 9. The force generates a stress in respective portions of the seal structure and breaks the seal structure, thereby reducing a waterproof performance when a force is transmitted to the dust boot 011 via the collar 010 in accordance with a lateral motion of the rack shaft 04. As a result, the dust boot 011 is extended and compressed to a rack end at a maximum stroke of the rack shaft 04. In this case, in FIG. 9, an arrow D indicates a moving direction of the rack shaft 04 and the tie rods 05 and 05.

In particular, the inner surface side of the dust boot 011 is pressed by the guide shoe 07 in the contact portion between the metal fitting 013 and the annular protruding wall 025 of the dust boot 011. Therefore, the compression reaction force F acts in a direction of contact with the metal fitting 013 in the outer surface side of the dust boot 011 and deforms the outer peripheral portion of the metal fitting 013 so as to bend outward toward the tie rods 05 and 05 side.

The metal fitting 013 is deformed in this manner, whereby a gap is generated in the contact portion between the metal fitting 013 and the annular protruding wall 025. There occurs a situation where water flowing towards the direction of B enters into the dust boot 011 via the gap and further into the gear box housing 03.

This situation is also generated in the same manner in the case that a tensile reaction force acts on the seal structure. Due to generation of this matter, there is a risk that a reliability with respect to the seal structure of the tie rod mounting portion in the center take-off type power steering apparatus is damaged.

In particular, since the compressive reaction force F and the tensile reaction force is further strengthened in the case that snow or the like are accumulated on a bellows portion of the dust boot 011 in winter season and the bellows can not move, the risk mentioned above is further increased.

The applicant of the present application has made an original idea of a seal structure of a tie rod mounting portion in a center take-off type power steering apparatus which can solve the problems mentioned above. It is provided in the conventional seal structure of the tie rod mounting portion in the center take-off type power steering apparatus, and can prevent the stress from being generated in the seal structure even when the force is transmitted to the dust boot via the collar. This happens in accordance with the lateral motion of the rack shaft and the dust boot is extended and compressed to the rack end at the maximum stroke of the rack shaft, thereby maintaining a waterproof performance and improving a reliability of the seal, and has filed a patent application (refer to Japanese Patent Application No. 11-1054).

SUMMARY OF THE INVENTION

The present invention intends to solve the above problems so as to improve a reliability of seal in a center take-off type power steering apparatus structured such that respective inner ends of a pair of right and left tie rods are swingably connected to a leg portion of a T-shaped connection member. Both arm portions of the T-shaped connection member are respectively connected to a rack shaft by a bolt passing through a guide shoe sliding within a notch groove formed along a lengthwise direction of a gear box housing. The respective inner ends of a pair of right and left tie rods laterally move in accordance with a lateral motion of the rack shaft while being guided by the guide shoe. A center portion of a dust boot is gripped between the guide shoe and both of the arm portions of the T-shaped connection member by being passed through. A collar is fitted between the guide shoe and the bolt and between the dust boot and the bolt so as to override between the rack shaft, the guide shoe and the dust boot. Also, one end portion of the collar protrudes from the dust boot so as to be brought into contact with the arm portion of the T-shaped connection member.

In accordance with the present invention, there is provided a seal structure of a tie rod mounting portion in a center take-off type power steering apparatus structured such that respective inner ends of a pair of right and left tie rods are swingably connected to a leg portion of a T-shaped connection member. Both arm portions of the T-shaped connection member are respectively connected to a rack shaft by a bolt passing through a guide shoe sliding within a notch groove formed along a lengthwise direction of a gear box housing. The respective inner ends of a pair of right and left tie rods laterally move in accordance with a lateral motion of the rack shaft while being guided by the guide shoe. A center portion of a dust boot is gripped between the guide shoe and both of the arm portions of the T-shaped connection member by being passed through by the bolts. A collar is fitted between the guide shoe and the bolt and also between the dust boot and the bolt so as to override between the rack shaft, the guide shoe and the dust boot. One end portion of the collar protrudes from the dust boot so as to be brought into contact with the arm portion of the T-shaped connection member, wherein a stepped recess portion to which both of the arm portions of the T-shaped connection member are fitted. A annular protruding wall which surrounds one end portion of the collar and is brought into contact with the arm portion of the T-shaped connection member are respectively formed in the dust boot.

BRIEF DESCRIPTION OF THE DRAWINGS

The present invention will be more fully understood from the detailed description given below and from the accompanying drawings which should not be taken to be a limitation on the invention, but are for explanation and understanding only. The drawings

DESCRIPTION OF THE PREFERRED EMBODIMENTS

A description will be given below of an embodiment stated in claims 1 to 3 of the present application with reference to FIGS. 1 to 7.

Figure 1:
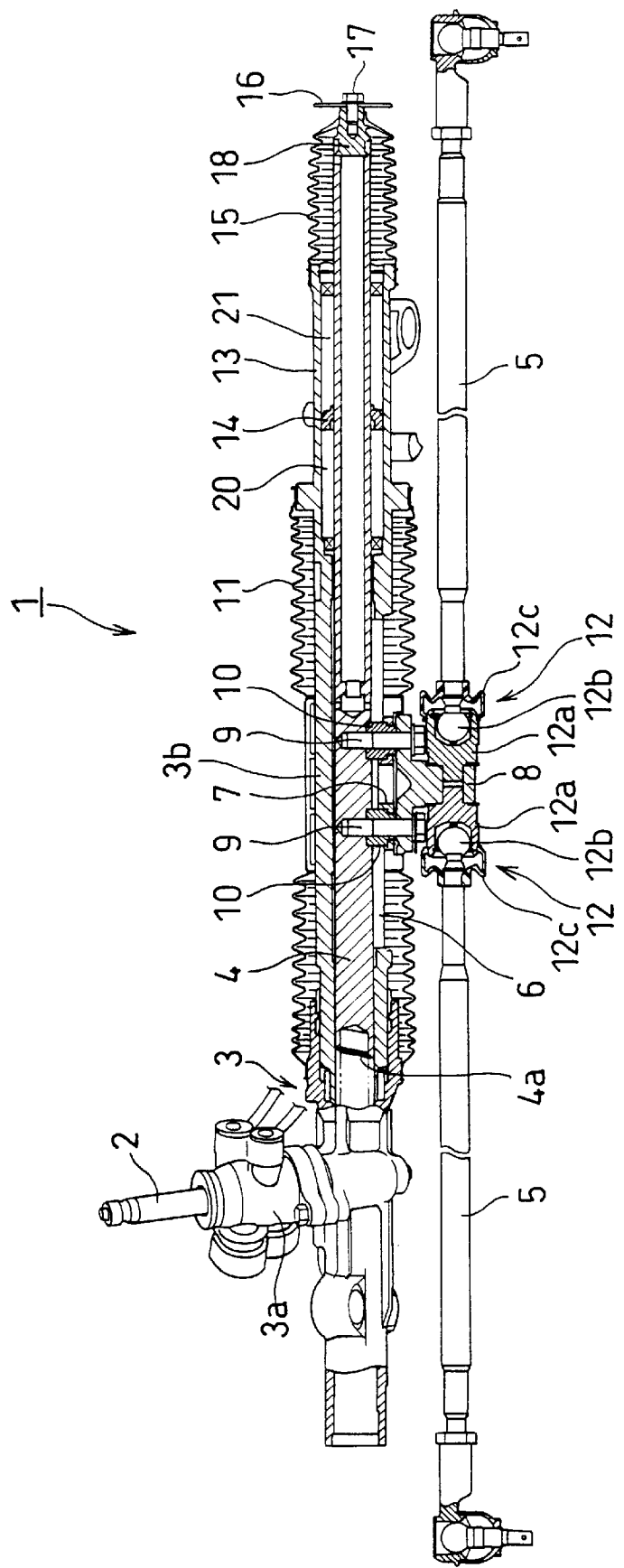
FIG. 1 is a front elevational cross sectional view of a center take-off type power steering apparatus to which a seal structure of a tie rod mounting portion in accordance with an embodiment of the present invention is applied, a part of which is shown by an outer surface view.

In FIG. 1, a center take-off type hydraulic power steering apparatus 1 to which a seal structure of a tie rod mounting portion in accordance with a embodiment is applied is a rack and pinion type power steering apparatus. A steering input shaft 2 connected to a handle of a vehicle (not shown) is connected to an output shaft (not shown) via a torsion bar within a rotary valve receiving portion 3a of a gear box housing 3. A rack shaft 4 having a rack 4a meshing with a pinion formed in the output shaft is received within a rack shaft receiving portion 3b of the gear box housing 3 in such a manner as to freely slide in a lateral direction in FIG. 1.

Further, a pair of right and left tie rods 5 and 5 are provided so that respective inner ends thereof are positioned near a center portion of the rack shaft receiving portion 3b of the gear box housing 3 (near a center portion of a vehicle body).

A notch groove 6 is formed along a predetermined length in a substantially center portion in a lengthwise direction of the rack shaft receiving portion 3b of the gear box housing 3. The structure is made such that a guide shoe 7 can integrally move within the notch groove 6 in a lateral direction together with the rack shaft 4. Although a detailed illustration is omitted, the guide shoe 7 is a narrow plate body in which both end portions are formed in a semicircular shape and override between the respective inner ends of a pair of right and left tie rods 5 and 5, and a circular hole is punched out in the center portion. Accordingly, the portion is shown by a reverse printing in FIGS. 1 and 2.

The guide shoe 7 guides the respective inner end portions of a pair of right and left tie rods 5 and 5 so as to integrally move in a lateral direction together with the rack shoe 4. Accordingly, the respective inner end portions of the tie rods 5 and 5 are swingably connected to a leg portion 8a of a metal connection member 8 having a T-shaped cross section. Both arm portions 8b and 8b of the connection member 8 and the guide shoe 7 are connected to the rack shaft 4 via a collar 10 by a pair of right and left bolts 9 and 9. In accordance with the connection and joint structure among the respective inner end portions of the tie rods 5 and 5, the connection member 8, the guide shoe 7 and the rack shaft 4 mentioned above, these elements integrally move in a lateral direction.

Figure 2:
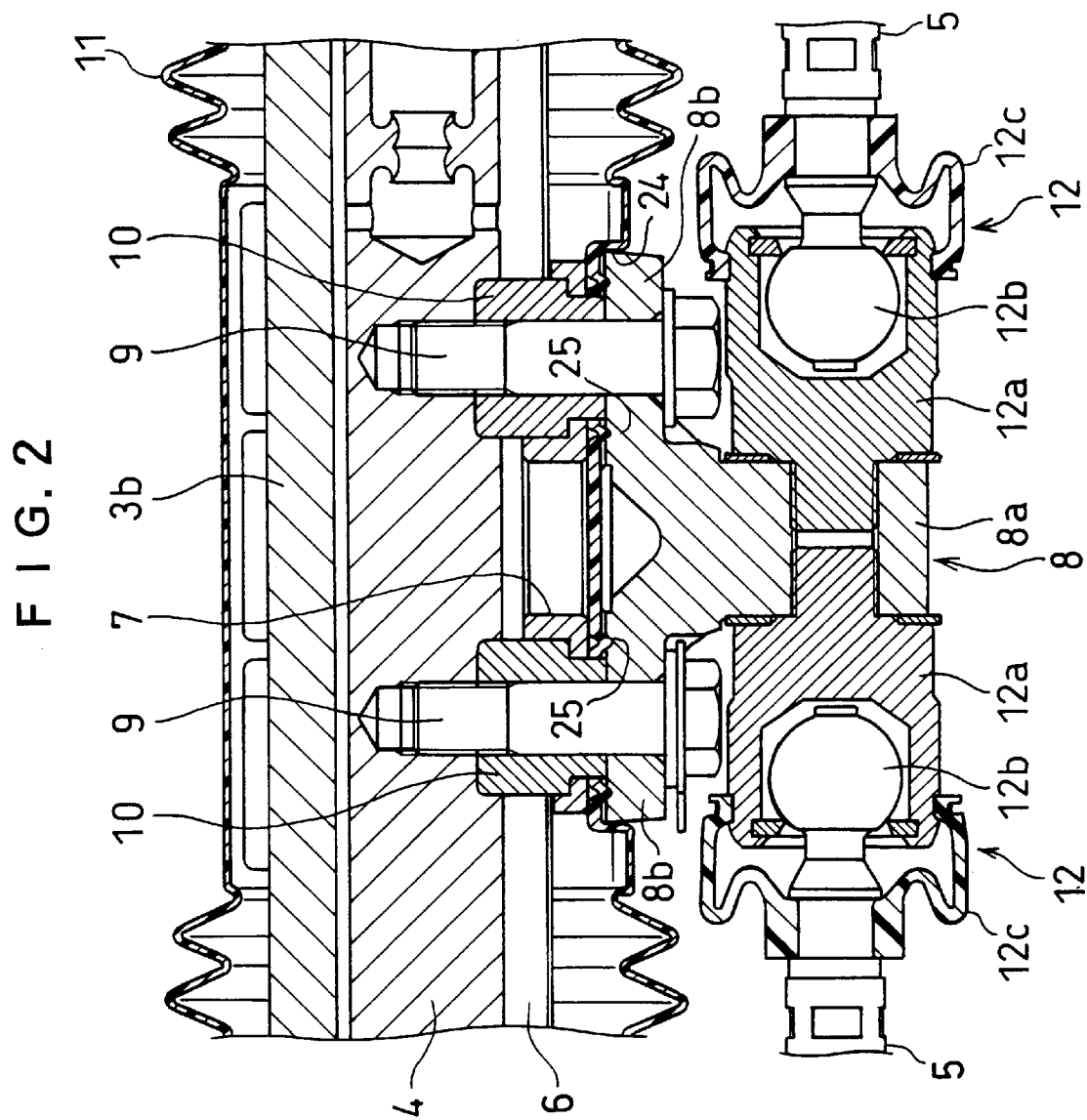
FIG. 2 is an enlarged view of a main portion of FIG. 1.
Figure 3:
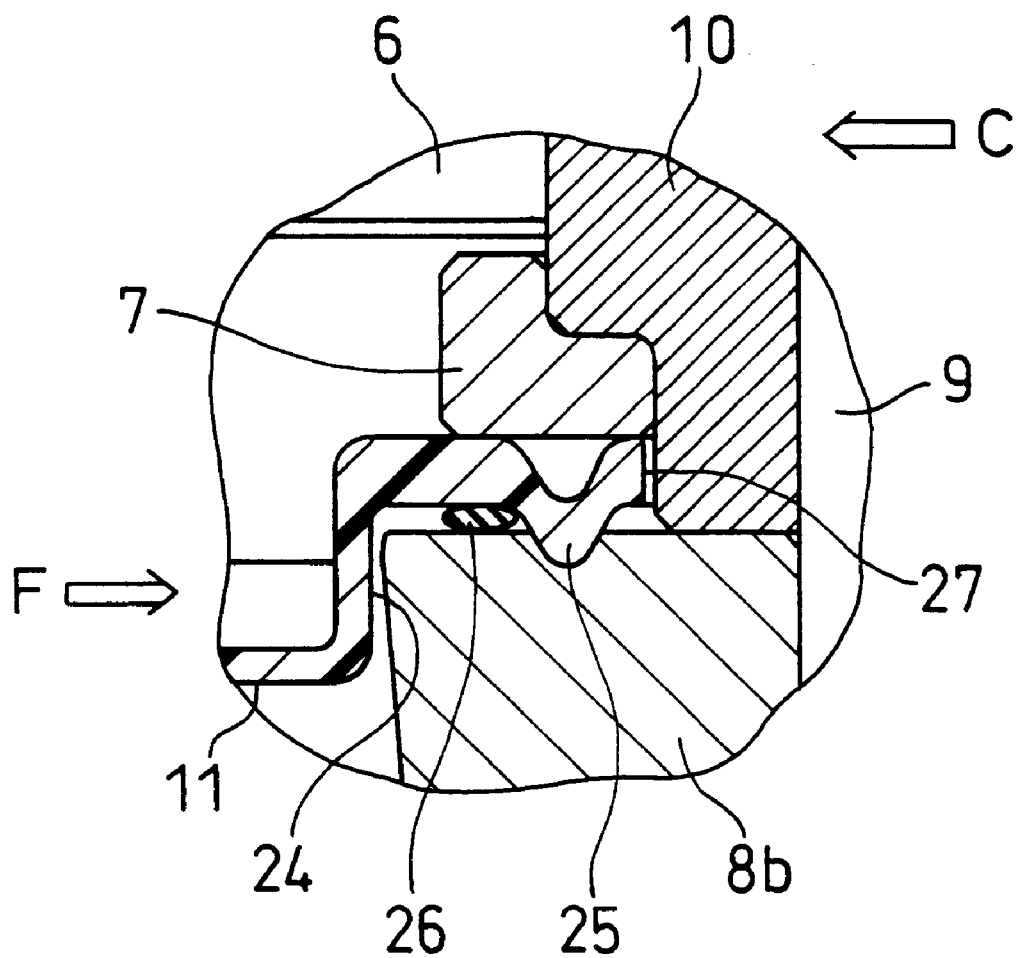
FIG. 3 is an enlarged view of a further main portion of FIG. 2.
Figure 4:
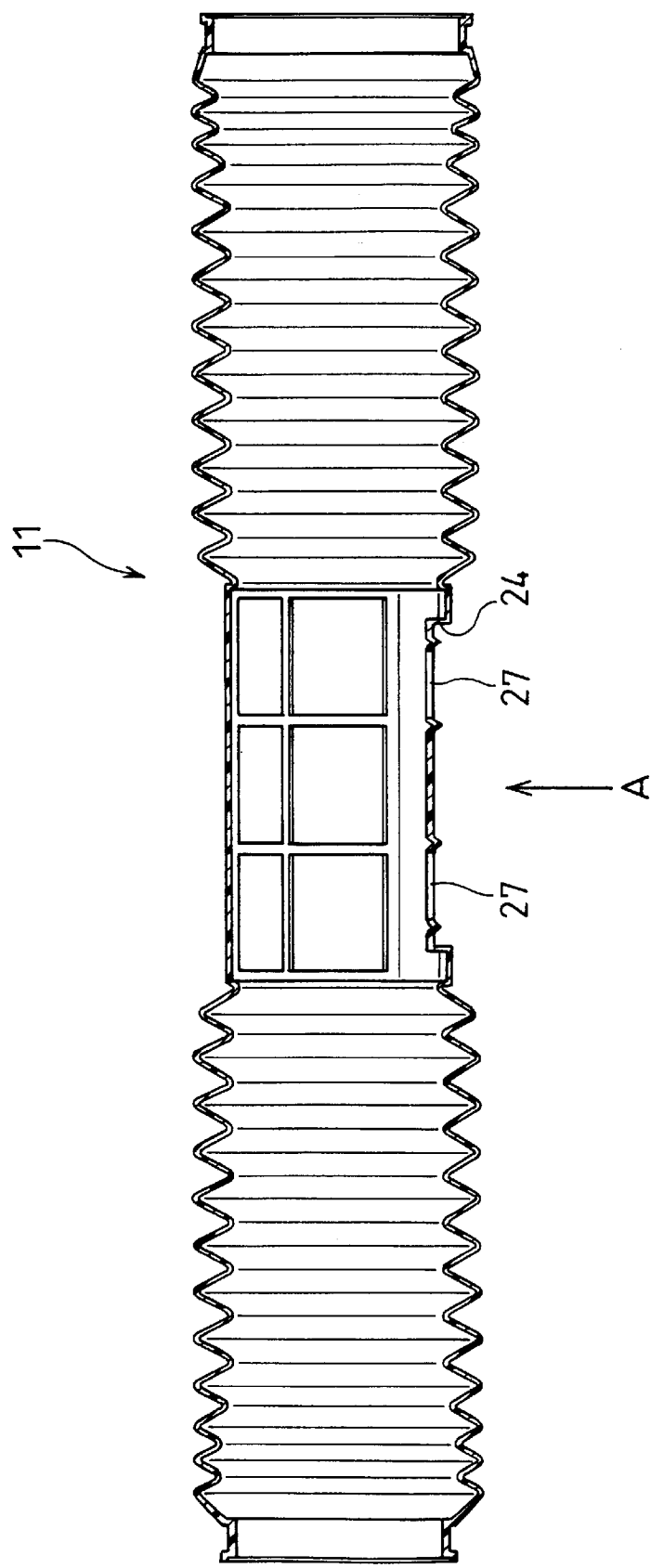
FIG. 4 is a vertical cross sectional view of a dust boot used for the center take-off type power steering apparatus in FIG. 1 and a cross sectional view taken along a line IV—IV in FIG. 5.

A center portion of a dust boot 11 is gripped between both of the arm portions 8b and 8b of the connection member 8 and the guide shoe 7 by extending the bolts 9 and 9 therethrough as shown in FIGS. 1 to 3. In this FIG, the structure is made such that respective right and left half portions of the dust boot 10 can extend and compress in accordance with a lateral motion of the rack shaft 4 and the tie rods 8 and 8. In this case, the collars 10 and 10 are respectively interposed between the dust boot 11 and the bolts 9 and 9, in a portion where a center portion of the dust boot 11 is extended therethrough by the bolts 9 and 9.

The dust boot 11 covers the center portion of the rack shaft receiving portion 3b in the gear box housing 3. The center portion corresponds to an area surrounded by the rotary valve receiving portion 3a of the gear box housing 3 and a portion near a left end of a power cylinder 13 mentioned below in FIG. 1.

Figure 5:
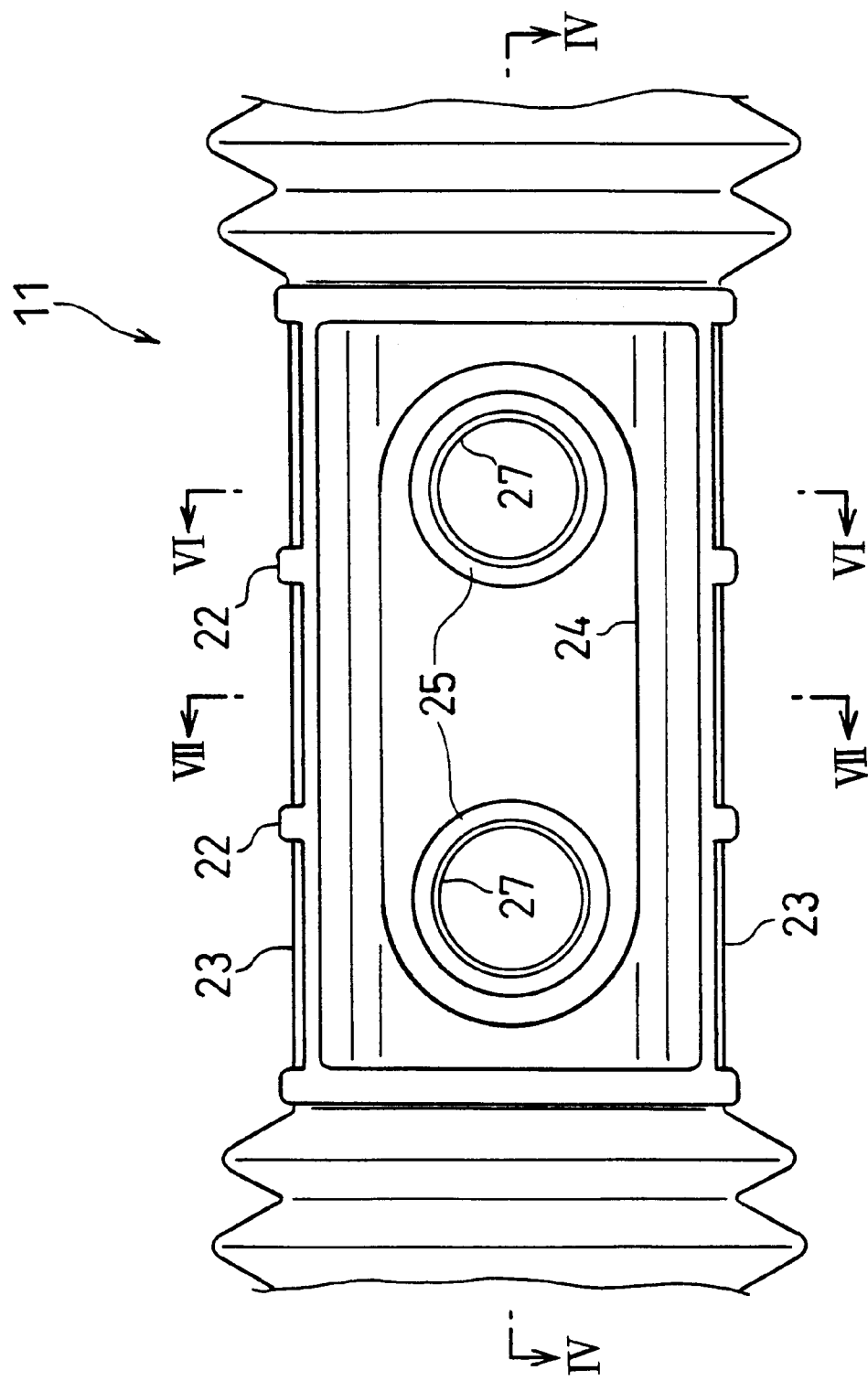
FIG. 5 is a side elevational view as seen from a direction of A in FIG. 4.
Figure 6:
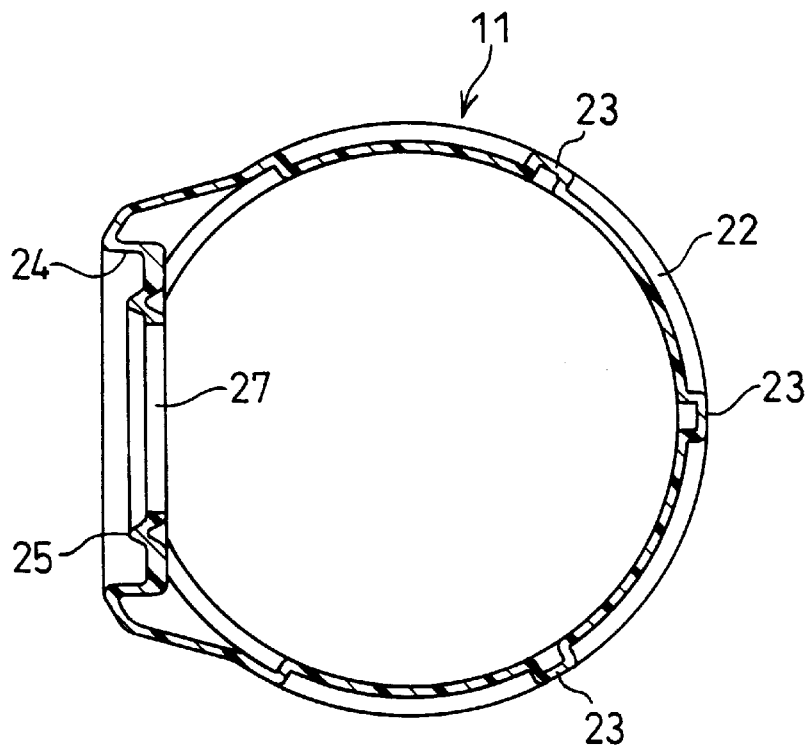
FIG. 6 is a cross sectional view taken along a line VI—VI in FIG. 5.
Figure 7:
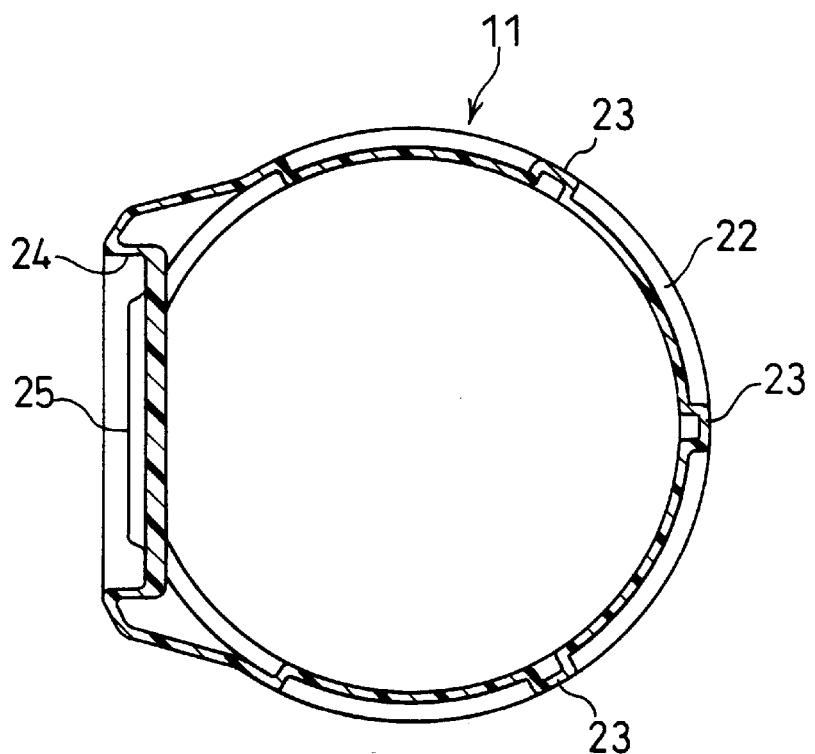
FIG. 7 is a cross sectional view taken along a line VII—VII in FIG. 5.
Figure 8:
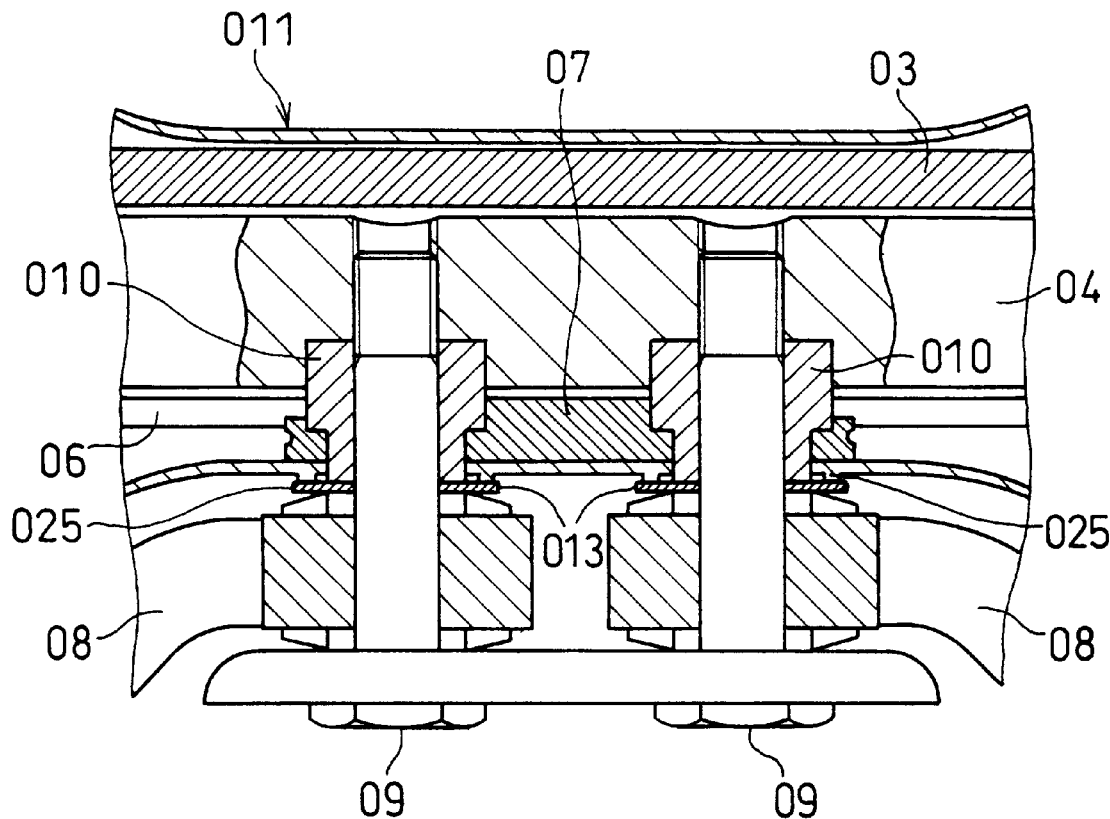
FIG. 8 is a view corresponding to FIG. 2 and shows a conventional embodiment.
Figure 9:
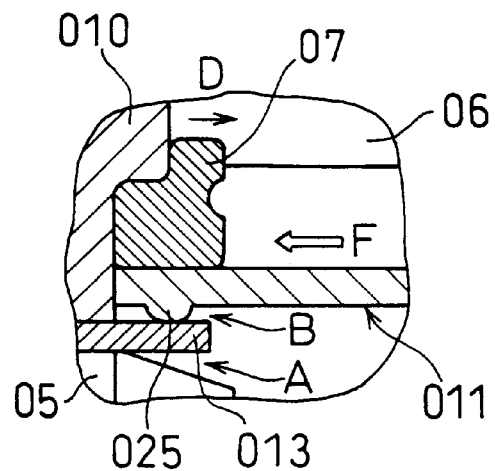
FIG. 9 is a partly enlarged view of FIG. 8.

Further, a plurality of protrusions 22, . . . , 23, . . . are formed in the center portion of the dust boot 11. That is, on the outer peripheral surface of the center portion except the portion gripped between both arm portions 8b and 8b of the connection member 8 and the guide shoe 7, in a peripheral direction and axial direction, as shown in FIGS. 5 to 7, thereby improving a rigidity of the portion in the dust boot 11.

The collar 10 is fitted all around the rack shaft 4, the guide shoe 7 and the dust boot 11 so as to position the rack shaft 4, the guide shoe 7, the dust boot 11 and both of the arm portions 8b and 8b of the connection member 8 with respect to each other. One end portion (a lower end portion in FIG. 2) of the collar 10 protrudes from the dust boot 11, and a flat lower end surface thereof is brought into contact with a flat upper surface (an end surface facing to the dust boot 11) of the arm portion 8b in the connection member 8, thereby constituting one seal portion for preventing water from entering.

A structure of a portion in which the respective inner end portions of the tie rods 5 and 5 are swingably connected to the connection member 8 is made as follows.

A bearing body 12a forming a main body of a ball joint 12 is engaged with each of both side surfaces of the leg portion 8a of the connection member 8 having the T-shaped cross section in a laterally symmetrical manner. The spherical body portions 12b and 12b in the respective inner ends of the tie rods 5 and 5 are inserted to bearing recess portions (bearing portion) of the bearing bodies 12a and 12a so as not to be disengaged. Accordingly, the respective inner end portions of the tie rods 5 and 5 are swingably connected to the connection member 8. A cover 12c is put on a connection portion between the bearing recess portion of the bearing body 12a and the spherical body portion 12b so as to cover the connection portion.

A portion close to a right end in FIG. 1 of the rack shaft receiving portion 3b of the gear box housing 3 is set to a power cylinder 13. Then, an end of the rack shaft 4 commonly serving as a power piston rod extends through the power cylinder 13 in a direction of a wheel house (not shown) of a vehicle so as to protrude. As mentioned above, one end of the rack shaft 4 extends through the power cylinder 13 so as to protrude, whereby within a chamber of the power cylinder 13, right and left pressure receiving areas of a piston 14 integrally provided in the rack shaft 4 are made equal to each other.

Respective end portions of a dust boot 15 are adhered to one end of the rack shaft 4 protruding from the power cylinder 13 and one end of a housing of the power cylinder 13 in the same side as the one end. The portion obtained by one end of the rack shaft 4 extending through the power cylinder 13 is covered by the dust boot 15. The dust boot 15 prevents the water from entering into the gear box housing 3 and keeps safety of the body.

A boot guard 16 is integrally mounted to one end of the rack shaft 4 by being fastened to an end surface of a rack end plug 18 by means of a bolt 17. The boot guard 16 comprises a metal disc. It has an outer diameter which is substantially the same as a maximum diameter. In the case that the dust boot 15 extends maximum, it doses a side facing the wheel house of the dust boot 15 and protects the dust boot 15 from a snow wall attaching and freezing on the inner and outer surfaces in the chamber wall of the wheel house.

A pressurized oil generating a steering assist force is flowed in to and out from oil chambers 20 and 21 formed by being separated into right and left portions by the piston 14 within the chamber of the power cylinder 13 in accordance with a switching control of a rotary valve (not shown) received within the rotary valve receiving portion 3a of the gear box housing 3.

Accordingly, when the handle of the vehicle is steered and the rack 4a of the rack shaft 4 is meshed with an output shaft and a pinion connected to the handle shaft in an interlocking manner so as to be laterally movable. The guide shoe 7 and the tie rods 5 and 5 integrally move in a lateral direction in accordance with the lateral motion, whereby right and left wheels are steered. At the same time, the steering assist force in correspondence to a steering resistance of the wheel acts on the piston 14 so as to be transmitted to the wheel via the lateral motion of the rack shaft 4 and the tie rods 5 and 5.

Next, a description will be given of a seal structure of the mounting portion of the respective inner end portions of the tie rods 5 and 5 to the rack shaft 4.

The seal structure is realized in the portion in which the center portion of the dust boot 11 is extended between the guide shoe 7 and both of the arm portions 8b and 8b of the connection member 8 by the bolts 9 and 9 so as to be gripped.

A stepped recess portion 24 having a width that both of the arm portions 8b and 8b of the T-shaped connection member 8 can just fit is formed in the portion in which the center portion of the dust boot 11 is extended through by the bolts 9 and 9. The stepped recess portion 24 formed in an oval shape having semicircular portions in both ends shown in FIG. 5. The shape coincides with a contour shape of an end surface in the side of the dust boot 11 of both of the arm portions 8b and 8b of the connection member 8.

One end portion in a small diameter side of each of the collars 10 and 10 interposed between the dust boot 11 and the bolts 9 and 9 protrudes from a bottom surface of the stepped recess portion 24 in the center portion of the dust boot 11, as mentioned above. It is brought into contact with the end surface in the side of the dust boot 11 of both of the arm portions 8b and 8b of the connection member 8. Reference numeral 27 denotes a fitting hole of the collar 10 formed on the bottom surface of the stepped recess portion 24 in the dust boot 11. The fitting hole 27 simultaneously corresponds to a through hole for the bolts 9 and 9 (refer to FIGS. 3, 5 and 6).

Annular protruding walls 25 and 25 are respectively formed in the portion in which the center portion of the dust boot 11 is extended through by the bolts 9 and 9. It is done in such a manner as to surround one end portion in the small diameter side of the collars 10 and 10 and is brought into contact with the end surface in the side of the dust boot 11 of the arm portions 8b and 8b of the T-shaped connection member 8. Then, a seal member 26 is interposed so as to surround the annular protruding wall 25 (see FIG. 3). The seal member 26 is constituted by an O-ring and is gripped between the bottom surface of the stepped recess portion 24 of the dust boot 11 and the end surface in the side of the dust boot 11 of the arm portions 8b and 8b in the T-shaped connection member 8.

Accordingly, the seal structure of the mounting portion with respect to the rack shaft 4 of the respective inner end portions of the tie rods 5 and 5 is constituted by bringing one end portion of the collars 10 and 10 into contact with the end surface on the side of the bust boot 11 of both of the arm portions 8b and 8b of the connection member 8. This brings the annular protruding walls 25 and 25 into contact with the end surface in the side of the dust boot 11 of the arm portions 8b and 8b of the connection member 8, and the seal member 26 interposed between the bottom surface of the stepped recess portion 24 of the dust boot 11 and the end surface in the side of the dust boot 11 of both of the arm portions 8b and 8b of the connection member 8.

In this case, the portion in which both of the arm portions 8b and 8b of the T-shaped connection member 8 are just fitted to the stepped recess portion 24 partly provides a seal function. However, mainly functions as a portion receiving a reaction force in a compression direction from the dust bot 11 when the force is transmitted to the dust boot 11 via the collar 10 in accordance with a lateral motion of the rack shaft 4.

That is, when the force is transmitted to the dust boot 11 via the collar 10 in accordance with the lateral motion of the rack shaft 4 and the dust boot 11 is extended and compressed. A compression reaction force F from the dust boot 11 (refer to a solid arrow in FIG. 3, the compression force F is directed to an axial direction of the rack shaft 4) is braked by the stepped wall of the stepped recess portion 24 being received by the side wall 8b of any one of the right and left arm portions 8b in the connection member 8. Accordingly, the compression reaction force F does not generate a stress in the respective portions constituting the seal structure.

In particular, it is possible to prevent the compression reaction force F from deforming the fitting hole 27 of the dust boot 11. In dong so water is prevented from entering into the dust boot 11 and further into the gear box housing 3 from the portion between the fitting hole 27 and the outer peripheral surface of the small diameter end portion of the collars 10 and 10 and between the guide shoe 7 and the inner peripheral surface of the bolt passing portion of the stepped recess portion 24 in the dust boot 11. In this case, in FIG. 3, an arrow C denotes a moving direction of the rack shaft 4 and a pair of right and left tie rods 5 and 5.

Since the present embodiment is structured in the manner mentioned above, the following effects can be obtained.

The seal structure of the tie rod mounting portion in the center take-off type power steering apparatus 1 arranged and comprised such that the respective inner ends of a pair of right and left tie rods 5 and 5 are swingably connected to the arm portion 8a of the T-shaped connection member 8. Both of the arm portions 8b and 8b of the T-shaped connection member 8 are respectively connected to the rack shaft 4 by the bolts 9 and 9 passing through the guide shoe 7 which slides within the notch groove 6 formed along the lengthwise direction of the gear box housing 3. The respective inner ends of a pair of right and left tie rods 5 and 5 laterally move in correspondence to the lateral motion of the rack shaft 4 while being guided by the guide shoe 7, the center portion of the dust boot 11 is gripped between the guide shoe 7 and both of the arm portions 8b and 8b of the T-shaped connection member 8 by being passed through by the bolts 9 and 9, the collars 10 and 10 are fitted between the guide shoe 7 and the bolts 9 and 9 and between the dust boot 11 and the bolts 9 and 9 so as to override between the rack shaft 4, the guide shoe 7 and the dust boot 11. One end portion of the collar 10 protrudes from the dust boot 11 so as to be brought into contact with the arm portion 8b of the T-shaped connection member 8, wherein the stepped recess portion 24 to which both of the arm portions 8b and 8b of the T-shaped connection member are fitted. The annular protruding wall 25 which surrounds one end portion of the collar 10 and is brought into contact with the arm portion 8b of the T-shaped connection member 8 are respectively formed in the dust boot 11.

As a result, in the event that the force is transmitted to the dust boot 11 via the collar 10 in accordance with a lateral motion of the rack shaft 4, the dust boot 11 is extended and compressed to a rack end at the maximum stroke of the rack shaft 4, a compression reaction force F from the dust boot 11 is applied. In accordance, the step wall of the stepped recess portion 24 formed in the dust boot 11 is brought into contact with the arm portion 8b of the T-shaped connection member 8 from an axial direction of the rack shaft 4. Hence there is not a compulsory force which is applied to the bolt extending hole 27 of the dust boot 11 (the fitting hole of the collar 10) and the seal portion of the portion in which the annular protruding wall 25 is brought into contact with the arm portion 8b of the T-shaped connection member 8. It is possible to greatly reduce the generation of stress in the seal structure for the tie rod mounting portion constituted by the contact portion between the annular protruding wall 25 of the dust boot 11 and the arm portion 8b of the T-shaped connection member 8, the contact portion between one end portion of the collar 10 and the arm portion 8b of the T-shaped connection member 8 or the like, it is possible to maintain a waterproof performance and it is possible to improve a reliability of the seal.

Further, the seal member 26 is interposed between the bottom surface of the stepped recess portion 24 in the center portion of the dust boot 11 and the end surface in the dust boot 11 side of the arm portion 8b of the T-shaped connection member 8. Thus it surrounds the annular protruding wall 25 the seal structure for the tie rod mounting portion is layered and it is possible to widely improve a reliability of the seal.

Further, a plurality of protrusions 22, . . . , 23, . . . are formed on the outer peripheral surface of the center portion gripped by the bellows portions in both sides of the dust boot 11 (except the portion in which the stepped recess portion 24 is formed), in a peripheral direction and an axial direction. A rigidity of the center portion of the dust boot 11 is improved and no slackness is generated in this portion. Accordingly, when the force is transmitted to the dust boot 11 via the collar 10 in accordance with the lateral motion of the rack shaft 4, the dust boot 11 is smoothly extended and compressed and is not brought into contact with the outer peripheral surface of the gear box housing 3, so that it is possible to prevent an abrasion due to contact.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A seal structure of a tie rod mounting portion in a center take-off power steering apparatus, comprising respective inner ends of a pair of right and left tie rods swingably connected to a leg portion of a T-shaped connection member, both arm portions of said T-shaped connection member are respectively connected to a rack shaft by a bolt passing through a guide shoe sliding within a notch groove formed along a lengthwise direction of a gear box housing, the respective inner ends of said pair of right and left tie rods being laterally movable in accordance with a lateral motion of said rack shaft while being guided by said guide shoe, a center portion of a dust boot being gripped between said guide shoe and both of the arm portions of said T-shaped connection member by being passed through by said bolts, a collar disposed between said guide shoe and said bolt and between said dust boot and said bolt so as to override between said rack shaft, said guide shoe and said dust boot, and one end portion of said collar which protrudes from said dust boot so as to be brought into contact with the arm portion of said T-shaped connection member, wherein a stepped recess portion to which both of the arm portions of said T-shaped connection member are fitted, and an annular protruding wall which surrounds one end portion of said collar and which is brought into contact with the arm portion of said T-shaped connection member, are respectively formed in said dust boot.

2. A seal structure of a tie rod mounting portion in a center take-off power steering apparatus according to claim 1, wherein a seal member is interposed between said dust boot and the arm portion of said T-shaped connection member so as to surround said annular protruding wall.

3. A seal structure of a tie rod mounting portion in a center take-off power steering apparatus as claimed in claim 1, wherein a plurality of protrusions are disposed on an outer peripheral surface of a center portion gripped by bellows portions on both sides of said dust boot, except a portion in which said stepped recess portion is formed, in a peripheral direction and an axial direction.

4. A seal structure of a tie rod mounting portion in a center take-off power steering apparatus as claimed in claim 2, wherein a plurality of protrusions are formed on an outer peripheral surface of a center portion gripped by bellows portions on both sides of said dust boot, except a portion in which said stepped recess portion is formed, in a peripheral direction and an axial direction.

* * * * *